(12) United States Patent
Brostmeyer et al.

(10) Patent No.: US 11,286,805 B2
(45) Date of Patent: Mar. 29, 2022

(54) MULTI-SPOOL GEARED TURBOFAN ARRANGEMENT WITH INTEGRATED STARTER/GENERATOR

(71) Applicant: Florida Turbine Technologies, Inc., Jupiter, FL (US)

(72) Inventors: Joseph D. Brostmeyer, Jupiter, FL (US); Robert A. Ress, Jr., Carmel, IN (US); Tyler W. Sloss, Chapel Hill, NC (US); Barry J. Brown, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 107 days.

(21) Appl. No.: 16/908,566

(22) Filed: Jun. 22, 2020

(65) Prior Publication Data

US 2021/0396148 A1   Dec. 23, 2021

(51) Int. Cl.
| | |
|---|---|
| *F02C 7/06* | (2006.01) |
| *F01D 15/12* | (2006.01) |
| *F02C 7/32* | (2006.01) |
| *F01D 15/10* | (2006.01) |
| *F02C 7/36* | (2006.01) |
| *F02C 7/275* | (2006.01) |
| *F01D 25/16* | (2006.01) |

(52) U.S. Cl.
CPC ............ *F01D 15/12* (2013.01); *F01D 15/10* (2013.01); *F02C 7/06* (2013.01); *F02C 7/275* (2013.01); *F02C 7/32* (2013.01); *F02C 7/36* (2013.01); *F01D 25/16* (2013.01)

(58) Field of Classification Search
CPC .................................. F02C 7/268; F02C 7/275
See application file for complete search history.

(56) References Cited

U.S. PATENT DOCUMENTS 2,529,973 A * 11/1950 Sedille .................... F02C 7/268
60/262
2,652,685 A * 9/1953 Willgoos ................ F02C 7/268
60/624

(Continued)

FOREIGN PATENT DOCUMENTS

| EP | 3597883 A1 | 1/2020 | |
|---|---|---|---|
| WO | 2010067172 A2 | 6/2010 | |
| WO | WO-2010067172 A2 * | 6/2010 | ................ F02C 6/14 |

OTHER PUBLICATIONS

International Search Report for International Application No. PCT/IB2021/055464, issued by European Patent Office, dated Sep. 13, 2021 (3 pages).

*Primary Examiner* — Todd E Manahan
*Assistant Examiner* — Marc J Amar
(74) *Attorney, Agent, or Firm* — Katherine Koenig; Koenig IP Works, PLLC

(57) ABSTRACT

A geared turbofan engine with at least one compression stage and at least one turbine stage on a high speed shaft, the high speed shaft coupled through a speed reduction gear box to a low speed shaft with a fan and a starter/generator. The low speed shaft is collinear with the high speed shaft but does not rotate within the high speed shaft. The speed reduction gear box is positioned between and mechanically couples the high speed shaft and the low speed shaft, which allows the fan and the integrated starter/generator on the low speed shaft to operate at a lower speed than the high speed shaft.

8 Claims, 2 Drawing Sheets

(56) References Cited

U.S. PATENT DOCUMENTS

| | | | | |
|---|---|---|---|---|
| 6,769,874 B2* | 8/2004 | Arel | ............. | B64C 11/02 416/60 |
| 7,144,349 B2* | 12/2006 | Mitrovic | ............. | B64D 35/00 475/331 |
| 9,828,109 B2* | 11/2017 | Mitrovic | ............. | B64C 11/44 |
| 2004/0070211 A1* | 4/2004 | Franchet | ............. | F02C 7/32 290/43 |
| 2004/0255590 A1* | 12/2004 | Rago | ............. | F02C 7/32 60/772 |
| 2007/0056291 A1* | 3/2007 | Koenig | ............. | F02K 3/06 60/203.1 |
| 2007/0101696 A1* | 5/2007 | Dooley | ............. | F02K 3/06 60/203.1 |
| 2007/0101721 A1* | 5/2007 | Dooley | ............. | F02C 7/32 60/721 |
| 2009/0289456 A1* | 11/2009 | McLoughlin | ............. | F02C 7/36 290/46 |
| 2010/0133832 A1* | 6/2010 | Butt | ............. | F02C 3/103 |
| 2014/0260306 A1* | 9/2014 | Dooley | ............. | F02K 3/06 60/203.1 |
| 2015/0125293 A1* | 5/2015 | Sheridan | ............. | F02C 3/107 415/229 |
| 2017/0335795 A1* | 11/2017 | Klemen | ............. | B64C 11/02 416/60 |
| 2020/0325821 A1* | 10/2020 | Hughes | ............. | F02C 3/103 |

* cited by examiner

MULTI-SPOOL GEARED TURBOFAN ARRANGEMENT WITH INTEGRATED STARTER/GENERATOR

GOVERNMENT RIGHTS STATEMENT

This invention was made with Government support under [Contract No. D17PC00072 awarded by the Department of Defense (DoD) Agency-Defense Advanced Research Projects Agency (DARPA). Distribution Statement "A" (Approved for Public Release, Distribution Unlimited). The U.S. Government has certain rights in this invention.

CROSS-REFERENCE TO RELATED APPLICATIONS

None.

TECHNICAL FIELD

The present technology is related generally to a gas turbine engine for a small aircraft, and more specifically to a multiple spool geared turbofan gas turbine engine with a high spool coupled through a reduction gear box to a low spool shaft with a fan and an integrated starter/generator (ISG). An integrated started/generator operates as a motor to start the engine, and as a generator to deliver electrical power after the engine has been started. The ISG is controlled by a power control module.

BACKGROUND

In a gas turbine engine, a compressor is driven by a turbine from a hot gas flow produced in a combustor. A turbofan gas turbine engine is used for aircraft propulsion and typically includes two or three shafts containing compressors, fans, turbines, and other rotating turbomachinery components. Each rotating shaft assembly is called a spool. The spools each turn at different rotor speeds and operate at different pressures in order to improve efficiency. A high spool has the highest compressor pressure and highest turbine inlet temperature and operates at a higher speed. A fan is typically connected to the lower speed spool since the fan operates more efficiently at this lower speed.

FIG. 1 shows a currently known twin spool gas turbine engine 10 with a fan 12 (also referred to as a twin spool turbofan engine). The high pressure compressor 14, the combustor 15, and the high pressure turbine 16 are formed on the high spool 18 or high speed shaft. The low pressure compressor 20 and the low pressure turbine 22 are formed on the low spool 24 or low speed shaft. The low spool 24 passes through and is concentric and coaxial with the high spool 18. Each spool 18, 24 is supported by bearings 26, 28. The low spool 24 or low speed shaft is directly connected to the fan 12 without the use of a speed reduction gear box.

The currently known twin spool turbofan engine 10 of FIG. 1 uses concentric shafts or spools, with a long low speed shaft 24 packaged within the shorter high speed shaft 18. This design suffers from several technical disadvantages when the engine is used in gas turbine engines for small aero vehicles. For example, the diameter of the bearings 26 for the high speed shaft 18 and bearing speeds are increased due to the larger diameter of the high speed shaft 18, thereby necessitating an increase in required oil flow and bearing complexity. Further, the bearings 26 for the high speed shaft 18 are located in high-pressure and high-temperature locations within the engine that result in increased leakages, the need for more complex bearings, and buffer cooling air demands. The rotor dynamics (such as bending) of a long low speed shaft 24 may require three or more bearings 28 to support the low speed shaft 24, which increases the cost and complexity of the engine. The rotor dynamics and packaging constraints reduce the feasibility of integrating a starter/generator directly on the high speed shaft 18. The complexity of the arrangement leads to a costly solution for a small expendable or attritable engine.

SUMMARY

Some embodiments advantageously provide a geared turbofan engine with multiple compression and turbine stages on a high speed shaft coupled through a speed reduction gear box to a low speed shaft with a fan and an integrated starter/generator (multi-spool geared turbofan engine with integrated starter/generator). The high speed shaft includes low and high pressure compressors and low and high pressure turbines. The low speed shaft includes the fan and the integrated starter/generator that operates at a lower speed due to the speed reduction gear box positioned between the two shafts. In other embodiments, the high speed shaft includes only one compressor and one turbine as the core of the engine.

In one embodiment, a gas turbine engine comprises: a high speed shaft, the high speed shaft including a compressor, a turbine, and a combustor between the compressor and the turbine; a low speed shaft, the low speed shaft including a fan and an integrated starter/generator; and a speed reduction gear box connecting the low speed shaft to the high speed shaft, wherein air flows into the fan and exits as a bypass air flow and a core flow, the core flow entering the compressor, then flows to the combustor to burn with a fuel, and then flows through the turbine, the turbine driving the low speed shaft through the speed reduction gear box.

In one aspect of the embodiment, the high speed shaft is supported by a first bearing located between the speed reduction gear box and the compressor and a second bearing located aft of the turbine.

In one aspect of the embodiment, the low speed shaft is supported by a third bearing located between the fan and the integrated starter/generator and a fourth bearing located between the integrated starter/generator and the speed reduction gear box.

In one aspect of the embodiment, the low speed shaft is supported by a third bearing and a fourth bearing, each of the third and fourth bearings being located between the integrated starter/generator and the speed reduction gear box.

In one aspect of the embodiment, the low speed shaft is collinear with the high speed shaft but does not rotate within the high speed shaft.

In one aspect of the embodiment, the speed reduction gear box is located between the integrated starter/generator and the compressor.

In one embodiment, a multiple spool geared turbofan gas turbine engine comprises: a high speed shaft, the high speed shaft including a first compressor, a second compressor downstream of the first compressor, a first turbine, a second turbine located downstream of the first turbine, and a combustor located between the second compressor and the first turbine; a low speed shaft, the low speed shaft including a fan and an integrated starter/generator located downstream of the fan; and a speed reduction gear box mechanically coupling the high speed shaft and the low speed shaft, the first turbine and the second turbine driving the high speed shaft and driving the low speed shaft through the speed reduction gear box.

In one aspect of the embodiment, the speed reduction gear box is located between the integrated starter/generator and the first compressor.

In one aspect of the embodiment, the first compressor is a low pressure compressor; and the second compressor is a high pressure compressor.

In one aspect of the embodiment, the first turbine is a high pressure turbine; and the second turbine is a low pressure turbine.

In one aspect of the embodiment, the low speed shaft is collinear with the high speed shaft but does not rotate within the high speed shaft.

In one aspect of the embodiment, the high speed shaft is supported by a first bearing located between the speed reduction gear box and the first compressor and a second bearing located aft of the second turbine.

In one aspect of the embodiment, the low speed shaft is supported by a third bearing located between the fan and the integrated starter/generator and a fourth bearing located between the integrated starter/generator and the speed reduction gear box.

In one aspect of the embodiment, the low speed shaft is supported by a third bearing and a fourth bearing, each of the third and fourth bearings being located between the integrated starter/generator and the speed reduction gear box.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
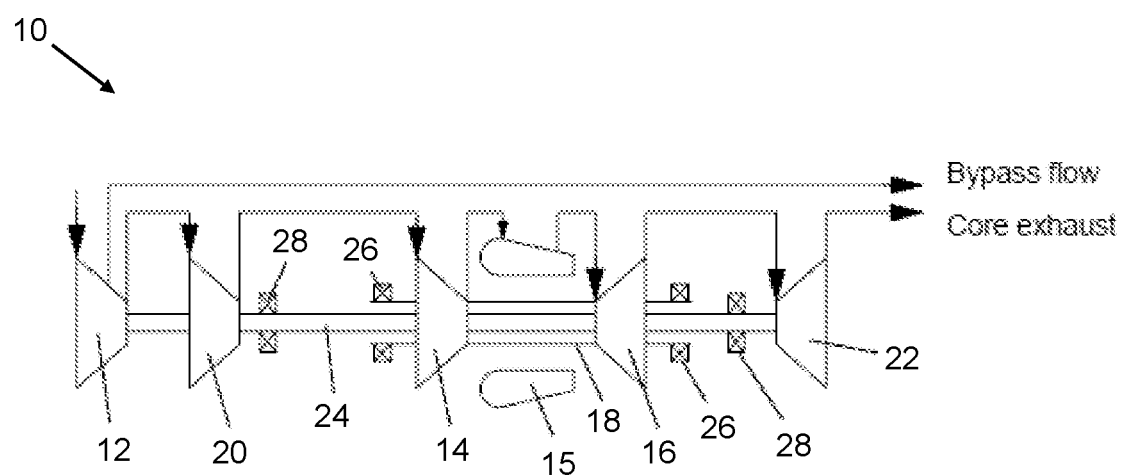
FIG. 1 shows a cross-section view of a twin spool turbofan gas turbine engine of the prior art.

Before describing in detail exemplary embodiments, it is noted that the embodiments reside primarily in combinations of apparatus components and steps related to a multi-spool geared turbofan engine with integrated starter/generator. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed herein is a multiple spool geared turbofan gas turbine engine (multi-spool geared turbofan engine with integrated starter/generator) with a low speed shaft having a fan and an integrated starter/generator connected to a high speed shaft through a speed reduction gear box. In one embodiment, the engine as disclosed herein may be used as a power plant for a small aero vehicle. This design reconfigures the high spool and the low spool into an arrangement with two shafts joined by a speed reduction gear box.

Figure 2:
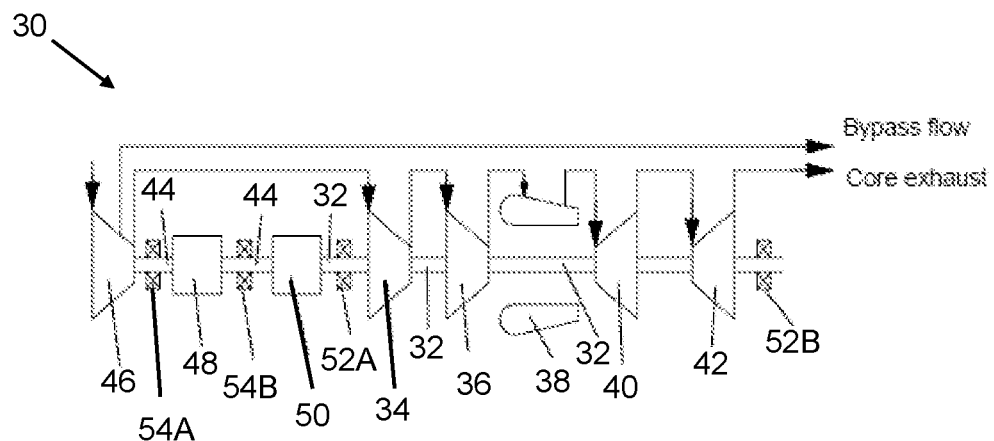
FIG. 2 shows a cross-section view of a first embodiment of a multiple spool geared turbofan engine with integrated starter/generator, in accordance with the present disclosure.

FIG. 2 shows a cross-section view of the multiple spool geared turbofan gas turbine engine 30 in accordance with the present disclosure. In one embodiment, the engine 30 includes a high speed shaft 32 with a low pressure compressor 34, a high pressure compressor 36, a combustor 38, a high pressure turbine 40, and a low pressure turbine 42. In one embodiment, the engine 30 further includes a low speed shaft 44 with a fan 46 and an integrated starter/generator 48. The low speed shaft 44 is connected through a speed reduction gear box 50 to the high speed shaft 32. The low speed shaft 44 is collinear with, but does not rotate within (that is, is not coaxial with), the high speed shaft 32.

Continuing to refer to FIG. 2, bearings 52, 54 are positioned at locations between the turbomachinery elements to adequately support both shafts 32, 44. Bearings 52 support the high speed shaft 32 while bearings 54 support the low speed shaft 44. In one embodiment, the high speed shaft 32 is supported by a first bearing 52A and a second bearing 52B, with the first bearing 52A being located between the speed reduction gear box 50 and the low pressure compressor 34 and the second bearing 52B being located aft of the low pressure turbine 42. In one embodiment, the low speed shaft 44 is supported by a third bearing 54A and a fourth bearing 54B, with the third bearing 54A being located between the fan 46 and the integrated starter/generator 48 and the fourth bearing 54B being located between the integrated starter/generator 48 and the speed reduction gear box 50. In another embodiment, both the third bearing 54A and the fourth bearing 54B are located between the integrated starter/generator 48 and the speed reduction gear box 50.

Continuing to refer to FIG. 2, in one embodiment air enters the fan 46 and then either bypasses the core engine as bypass flow or flows into the low pressure compressor 34 as core flow. In one embodiment, a first portion of the total intake air exits the fan 46 as bypass flow and a second portion of the total intake air exits the fan 46 as core flow. Compressed air from the low pressure compressor 34 then flows into the high pressure compressor 36 for further compression. The compressed air then flows into the combustor 38, where it is burned with a fuel to produce a hot gas flow that then enters the high pressure turbine 40 and then the low pressure turbine 42, from where the hot gas flow exits the engine 30 as core exhaust. The high pressure turbine 40 and the low pressure turbine 42 drive the low pressure compressor 34 and the high pressure compressor 36 through the high speed shaft 32 and also drive the low speed shaft 44 through the speed reduction gear box 50.

Figure 3:
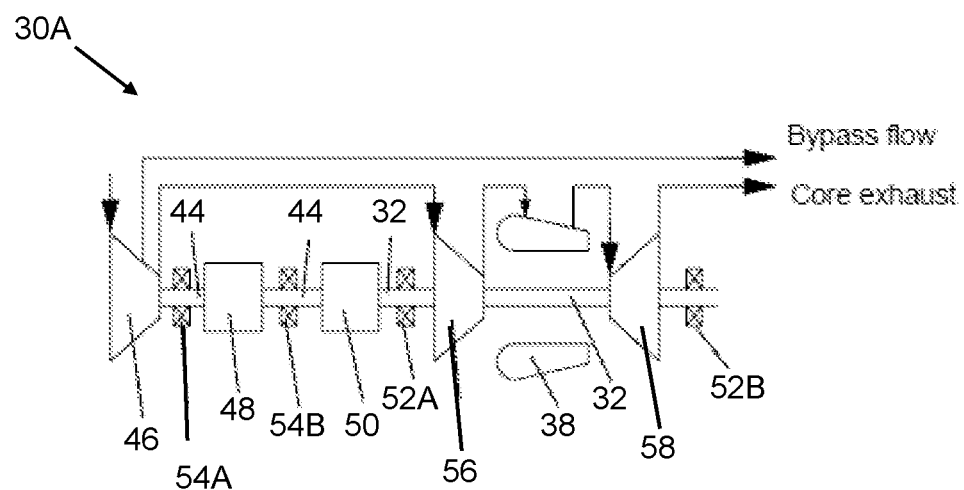
FIG. 3 shows a cross-section view of a second embodiment of a multi-spool geared turbofan engine with integrated starter/generator, in accordance with the present disclosure.

Referring now to FIG. 3, a second embodiment of a multiple spool geared turbofan gas turbine engine 30A in accordance with the present disclosure. The engine 30A of FIG. 3 is substantially similar to the engine 30 of FIG. 2, except In another embodiment of the engine of FIG. 2, the core of the engine includes only one compressor 56 and one turbine 58 on the high speed shaft 32 instead of the two compressors 34, 36 and the two turbines 40, 42 shown in FIG. 2. Components that are common to both FIGS. 2 and 3 are indicated with the same reference numbers. As shown, the flow of air from the fan 46 through the engine 30A is similar to that shown in FIG. 2, except that the core flow passes through only one compressor 56 and the hot gas flow from the combustor 38 passes only through one turbine 58. Further, the turbine 58 drives the compressor 56 through the high speed shaft 32 and also drives the low speed shaft 44 through the speed reduction gear box 50. Further, in one embodiment the high speed shaft 32 is supported by a first bearing 52A located between the speed reduction gear box 50 and the compressor 56 and a second bearing 52A located aft of the turbine 58. In some embodiments, the low speed shaft 44 is supported by a bearings 54A, 54B as shown and described in FIG. 2.

The multiple spool geared turbofan gas turbine engine of FIG. 2 offers several advantages over the currently known engine of FIG. 1. For example, bearing diameters and speeds can be reduced using the engine design of FIG. 2. Additionally, the bearings can be positioned within low pressure and temperature locations of the engine away from the combustor 38. Shorter shafts, as in FIG. 2, improve rotordynamic and stiffness issues, and also enable integration of a higher-capacity starter/generator onto the main (low-speed) shaft 44 of the engine 30 instead of being driven by a more-limiting power takeoff shaft. Further, multiple pressure ratio and bypass ratio fan designs can be incorporated without change to the core engine. Engine efficiency is improved relative to a conventional two spool design (for example, as shown in FIG. 1) of the same size. This arrangement leads to a less costly solution for a small expendable or attritable engine, and allows for growth in overall pressure ratio and turbine inlet temperature.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A gas turbine engine comprising:
a high speed shaft, the high speed shaft including a compressor and a turbine;
a combustor between the compressor and the turbine;
a low speed shaft, the low speed shaft including a fan and an integrated starter/generator; and
a speed reduction gear box connecting the low speed shaft to the high speed shaft, wherein air flows into the fan and exits as a bypass air flow and a core flow, the core flow entering the compressor, then flows to the combustor to burn with a fuel, and then flows through the turbine, the turbine driving the low speed shaft through the speed reduction gear box,
the high speed shaft being supported by a first bearing located between the speed reduction gear box and the compressor and a second bearing located aft of the turbine, and
the low speed shaft being supported by a third bearing located between the fan and the integrated starter/generator and a fourth bearing located between the integrated starter/generator and the speed reduction gear box.

2. The gas turbine engine of claim 1, wherein the low speed shaft is collinear with the high speed shaft but does not rotate within the high speed shaft.

3. The gas turbine engine of claim 1, wherein the speed reduction gear box is located between the integrated starter/generator and the compressor.

4. A multiple spool geared turbofan gas turbine engine comprising:
a high speed shaft, the high speed shaft including a first compressor, a second compressor downstream of the first compressor, a first turbine, and a second turbine located downstream of the first turbine;
a combustor located between the second compressor and the first turbine;
a low speed shaft, the low speed shaft including a fan and an integrated starter/generator located downstream of the fan; and
a speed reduction gear box mechanically coupling the high speed shaft and the low speed shaft, the first turbine and the second turbine driving the high speed shaft and driving the low speed shaft through the speed reduction gear box,
the low speed shaft being supported by a first bearing located between the fan and the integrated starter/generator and a second bearing located between the integrated starter/generator and the speed reduction gearbox, and
the low speed shaft being collinear with the high speed shaft but not rotating within the high speed shaft.

5. The multiple spool geared turbofan gas turbine engine of claim 4, wherein the speed reduction gear box is located between the integrated starter/generator and the first compressor.

6. The multiple spool geared turbofan gas turbine engine of claim 4, wherein:
the first compressor is a low pressure compressor; and
the second compressor is a high pressure compressor.

7. The multiple spool geared turbofan gas turbine engine of claim 4, wherein:
the first turbine is a high pressure turbine; and
the second turbine is a low pressure turbine.

8. The multiple spool geared turbofan gas turbine engine of claim 4, wherein the high speed shaft is supported by a third bearing located between the speed reduction gear box and the first compressor and a fourth bearing located aft of the second turbine.

* * * * *